Figure 2:
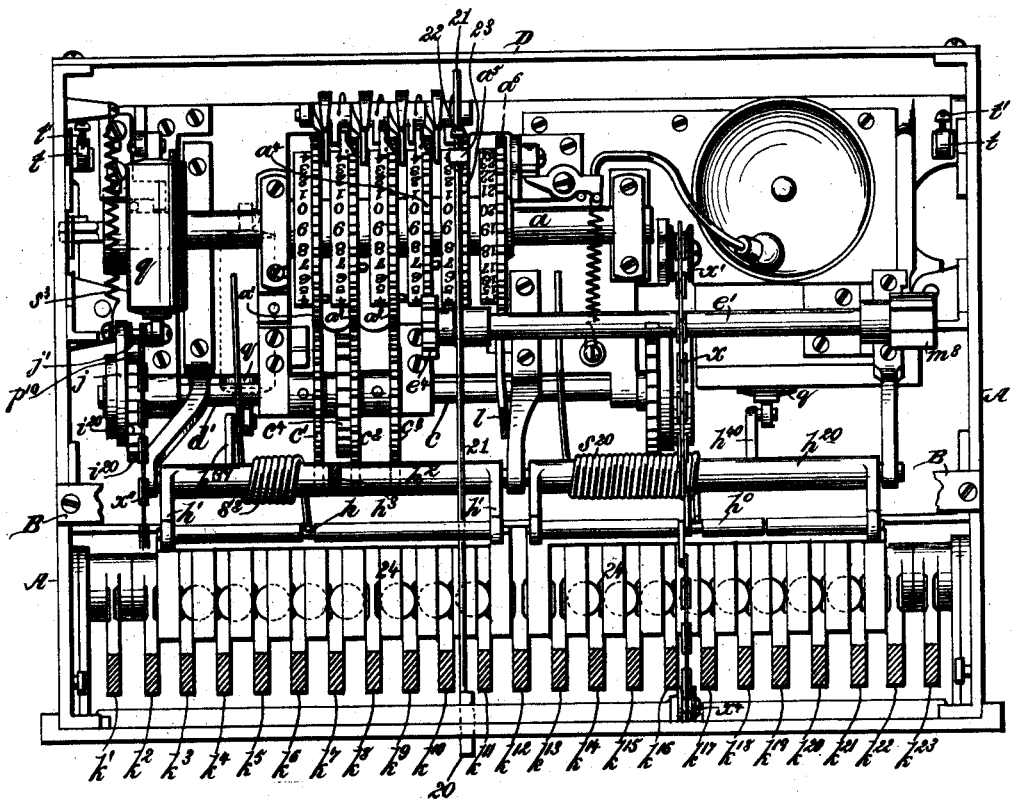

(No Model.) 8 Sheets—Sheet 1.

J. F. PFEFFER.
CASH INDICATOR AND REGISTER.

No. 422,828. Patented Mar. 4, 1890.

Fig. 1.

Witnesses.
Robt. Ewatt.
J. A. Rutherford.

Inventor.
John F. Pfeffer.
By
L. M. Hosea
Atty.

(No Model.) 8 Sheets—Sheet 2.
J. F. PFEFFER.
CASH INDICATOR AND REGISTER.

No. 422,828. Patented Mar. 4, 1890.

Witnesses,
Inventor:
John F. Pfeffer,
By
Atty.

(No Model.) 8 Sheets—Sheet 3.
J. F. PFEFFER.
CASH INDICATOR AND REGISTER.
No. 422,828. Patented Mar. 4, 1890.
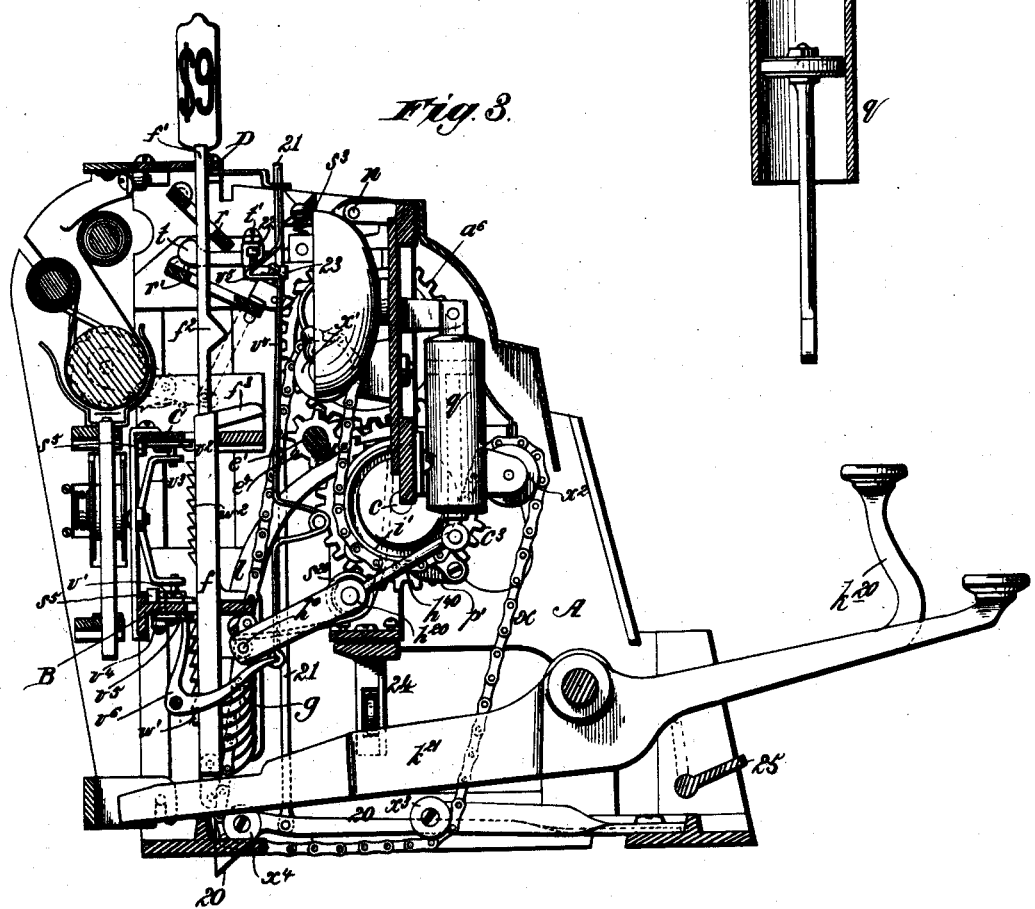
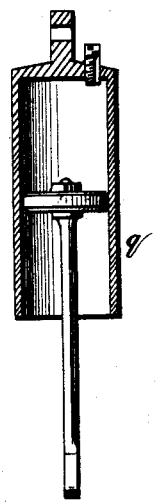
Witnesses.
Inventor:
John F. Pfeffer.
By
Atty.

(No Model.) 8 Sheets—Sheet 4.

J. F. PFEFFER.
CASH INDICATOR AND REGISTER.

No. 422,828. Patented Mar. 4, 1890.

Witnesses:
Inventor:
John F. Pfeffer
By L. M. Hosea
Atty.

(No Model.) 8 Sheets—Sheet 5.
J. F. PFEFFER.
CASH INDICATOR AND REGISTER.
No. 422,828. Patented Mar. 4, 1890.
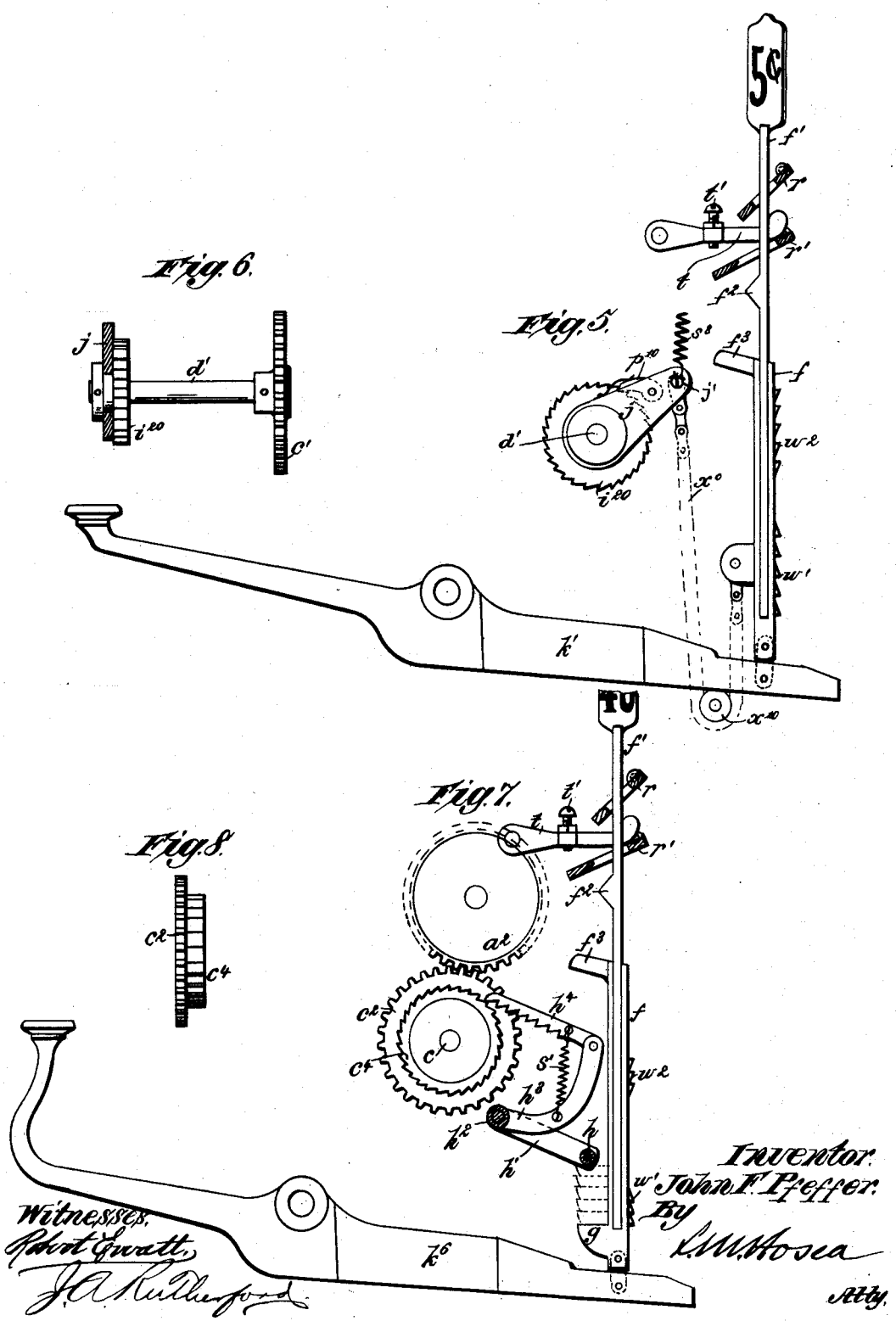
Witnesses
Inventor: John F. Pfeffer
By L. M. Hosea
Atty.

(No Model.) 8 Sheets—Sheet 6.
J. F. PFEFFER.
CASH INDICATOR AND REGISTER.
No. 422,828. Patented Mar. 4, 1890.
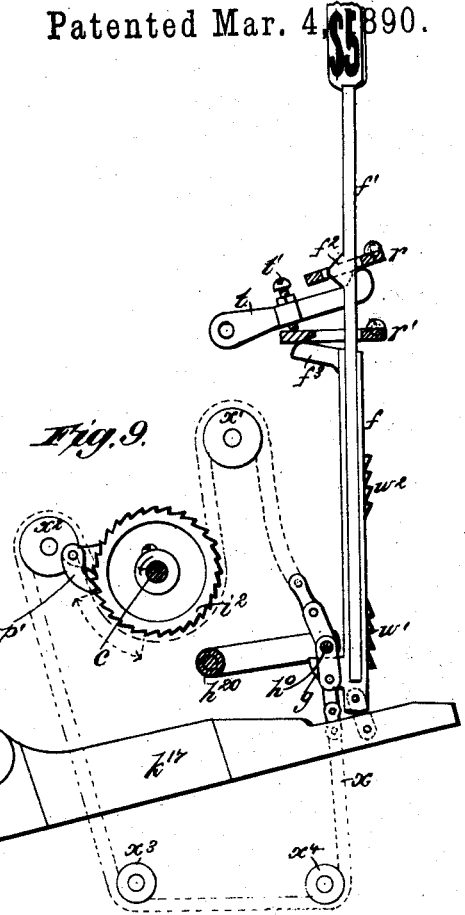
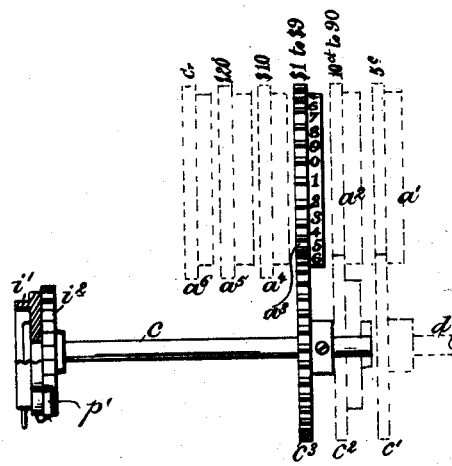
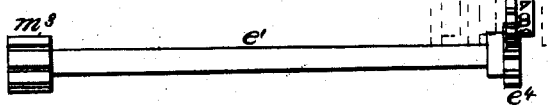
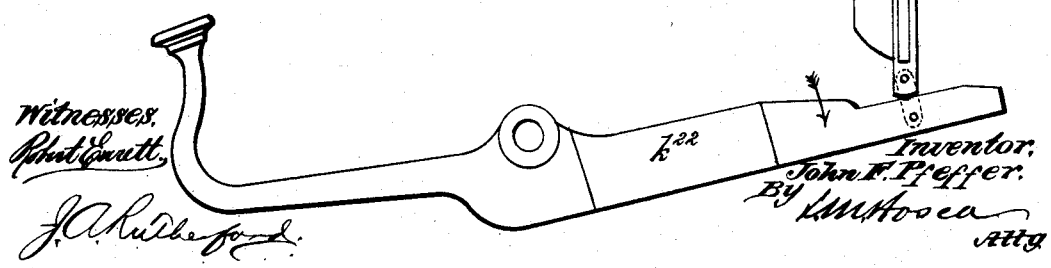
Witnesses
Inventor,
John F. Pfeffer.
By L. M. Hosea
Atty.

(No Model.) 8 Sheets—Sheet 7.

J. F. PFEFFER.
CASH INDICATOR AND REGISTER.

No. 422,828. Patented Mar. 4, 1890.

Witnesses:
Robert Emmett
J. A. Rutherford

Inventor:
John F. Pfeffer
By L. M. Hosea
Atty.

(No Model.) 8 Sheets—Sheet 8.
J. F. PFEFFER.
CASH INDICATOR AND REGISTER.
No. 422,828. Patented Mar. 4, 1890.
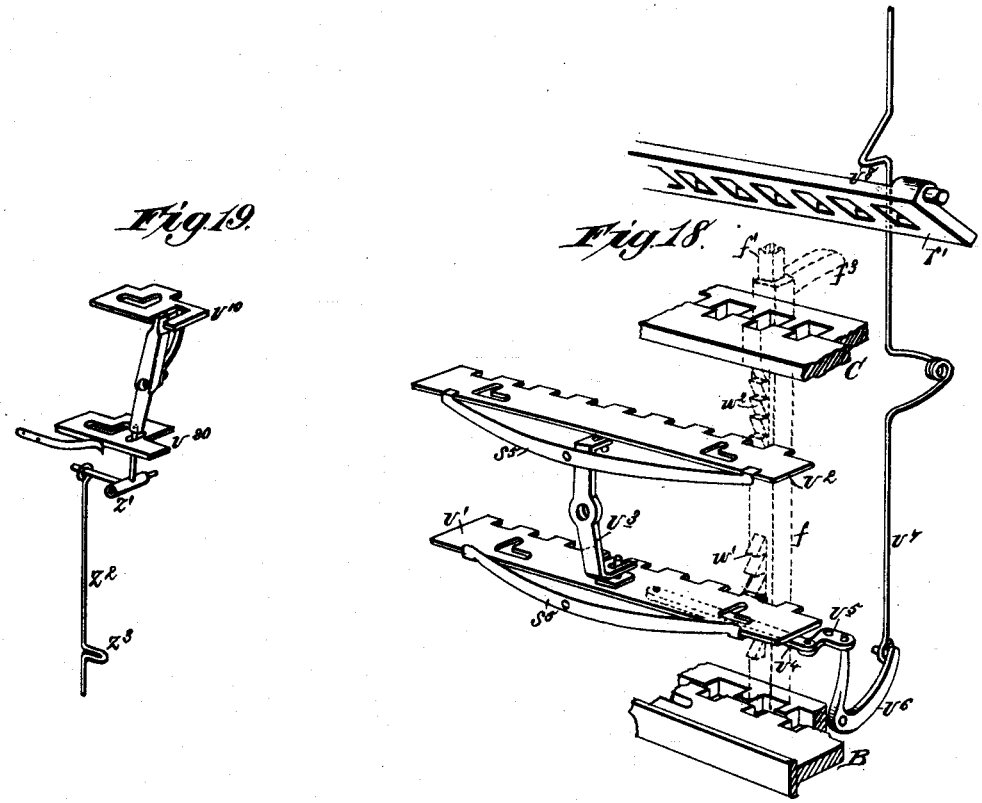

UNITED STATES PATENT OFFICE.

JOHN F. PFEFFER, OF CINCINNATI, OHIO.

CASH INDICATOR AND REGISTER.

SPECIFICATION forming part of Letters Patent No. 422,828, dated March 4, 1890.

Application filed August 17, 1889. Serial No. 321,105. (No model.)

*To all whom it may concern:*

Be it known that I, JOHN F. PFEFFER, a citizen of the United States, residing at Cincinnati, in the county of Hamilton and State of Ohio, have invented new and useful Improvements in Cash Registering and Indicating Apparatus, of which the following is a specification.

My invention relates to the class of devices commonly known as "cash-registers;" and it consists in improvements relating to the construction and certain of the functions of the apparatus, together with additional improvements relating to "indicating" mechanism embodied therein, the whole constituting a combined cash register and indicator, to which I have also added a separate recording mechanism, which latter, however, I have fully described and claimed in a separate application for Letters Patent, Serial No. 321,104, filed of even date herewith, and therefore do not describe in this.

My present improvements are directed more particularly, first, to the registering mechanism embracing the system of key-levers and their power-transmitting devices extending to and operating the register-wheels; second, to the construction and arrangement of the register system and improved devices for securing the transmitting or "carrying" action between the wheels from the lower to the higher in consecutive series, while permitting the independent actuation of any higher wheel without disturbance of its related lower wheel in series; third, to further improvements in connection with the system of registering in simplifying the means whereby the entire system of registering-wheels may be restored to a common zero relation to begin anew the registering action; fourth, to improvements in the mechanical operation and means of operating a bell-signal to indicate the fact of a registering action of any of the keys; fifth, to improved means of operating the cash-drawer by any one of the keys in connection with the registering action; sixth, to improved construction and operation of the system of "tablets" or visual indicators; seventh, to improvements in locking devices for the keys and standards, whereby a direct or return movement once begun must be completed before further use can be made of the key; eighth, in the construction and attachment of regulating devices to prevent overregistering or injuries from a too sudden impact of keys, and, lastly, in further improvements in constructive details of the general mechanism, all of which are fully hereinafter set forth.

Mechanism embodying my invention is illustrated in the accompanying drawings, in which—

Figure 4:
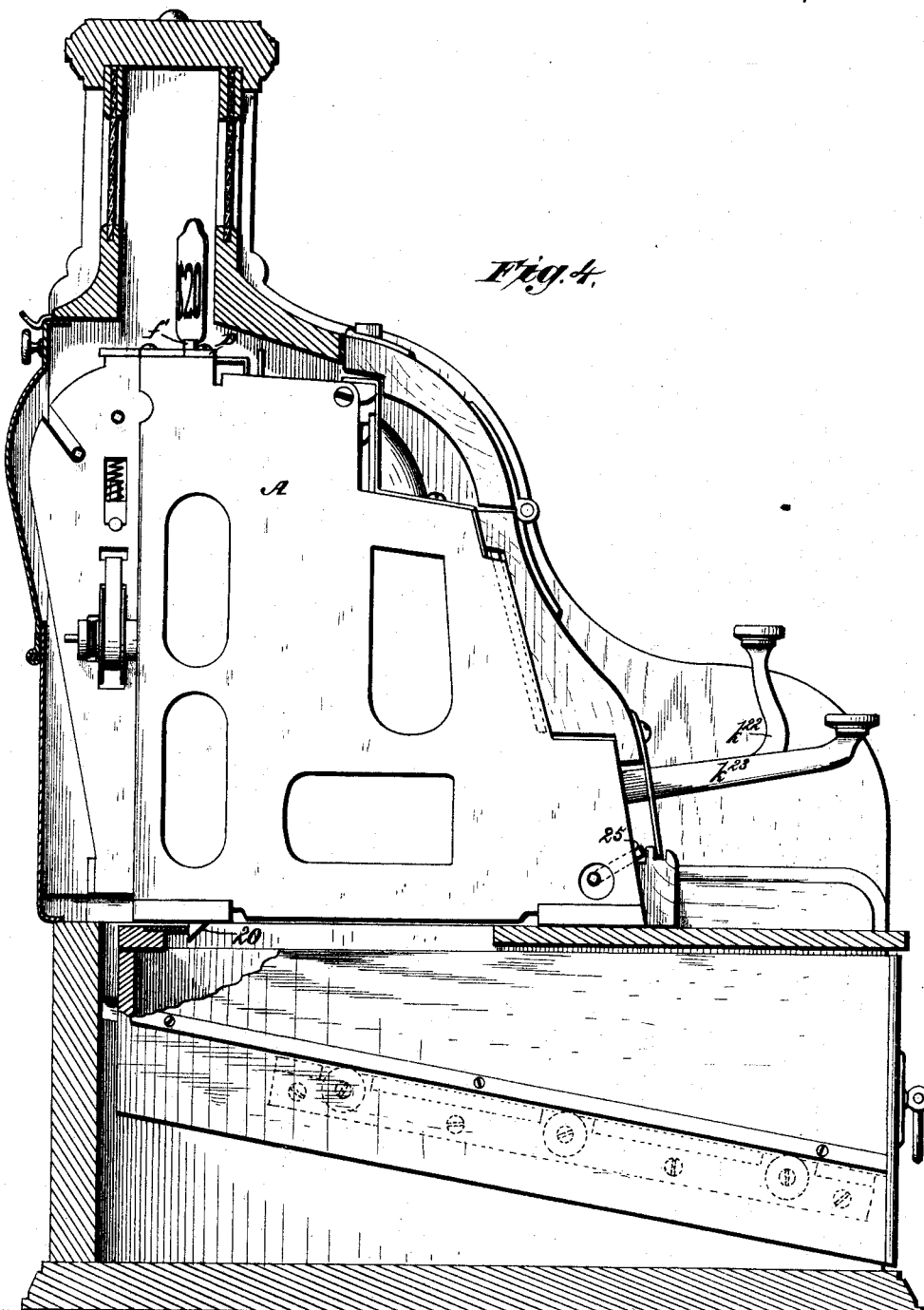
Figure 17:
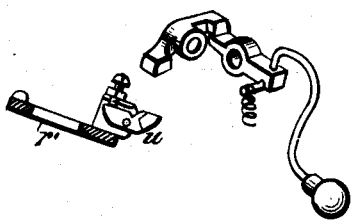
Figure 14:
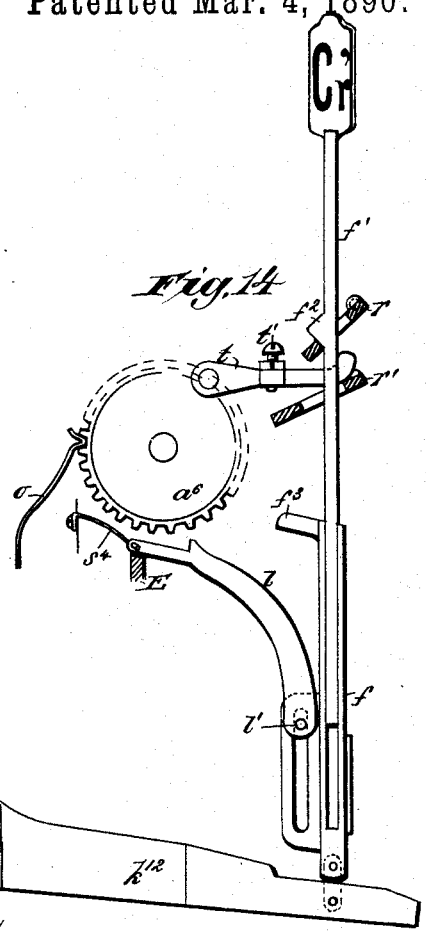
Figure 13:
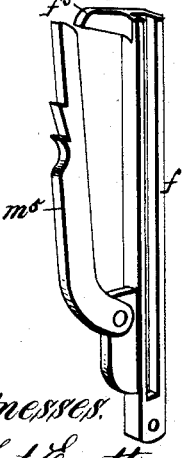
Figure 15:
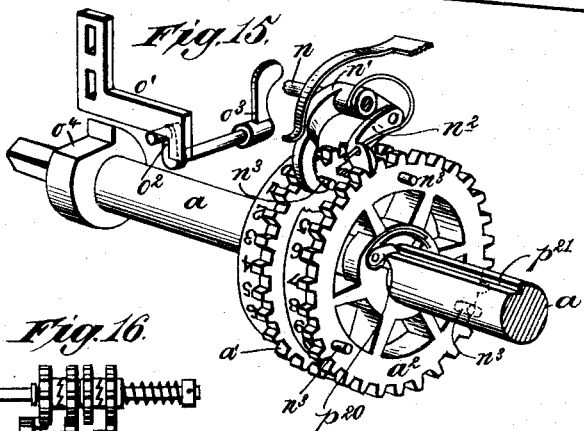
Figure 16:
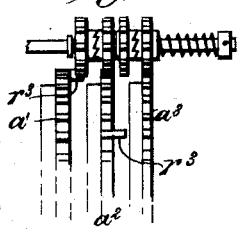

Figure 1 is a rear elevation of the mechanism detached from the inclosing-casing and omitting the printing-recorder; Fig. 2, a similar elevation omitting the standard and tablet-stem to exhibit more clearly the interior mechanism. Fig. 3 is a side elevation sectioned in the plane $x$ of Fig. 1; Fig. 4, a side elevation sectioned through the casing exhibiting the general supporting-frame of the mechanism in its relation to the casing and the construction and operation of the till-controlling devices; Figs. 5 and 6, detail views illustrating the construction and operation of the five-cent key; Figs. 7 and 8, detail views illustrating the construction and operation of the group of ten-cent keys; Figs. 9 and 10, detail views illustrating the construction and operation of the group of dollar-keys; Figs. 11, 12, and 13, detail views illustrating the construction and operation of the ten and twenty dollar keys; Fig. 14, a detail view illustrating the construction and operation of the "credit-key;" Fig. 15, a detail view in perspective, illustrating the construction and interconnecting action of the register-wheels and resetting mechanism; Fig. 16, a modification of the interconnecting devices; Fig. 17, a detail of the bell-sounding mechanism; Fig. 18, a detail perspective view illustrating the construction and operation of the tablet-stem and key-locking device as applied to the dime and dollar groups of keys; Fig. 19, a similar detail showing the locking device as applied to the five-cent key; Fig. 20, a detail showing a modification in the driving mechanism of the five-cent key and the dollar-register wheels, and Fig. 21 a detail sectional view of one of the regulating-cylinders.

Referring now to the drawings, I may remark at the outset that the general organization of this type of machines is old—that is to say, in having a series of keys for manipulating the various registering-wheels and elevating the indicating-tablets. I need not, therefore, describe the common features of such organization further than may be necessary to explain my improvements as illustrated in the present embodiment of the same.

The keys are arranged in two banks upon a common pivot, and are designated in the drawings by the letter $k$, distinguished by digital numbers in series from 1 to 23, consecutively. The two main groups $k^3$ to $k^{11}$, inclusive, and $k^{13}$ to $k^{21}$, inclusive, indicate, respectively, cents in multiples of ten up to ninety and dollars singly up to nine, consecutively. Of the remaining keys $k'$ indicates five cents, $k^2$ indicates "change"—that is, the opening of the drawer to make change merely—and $k^{12}$ indicates that a credit sale has been made. Each of the keys (except change) acts ultimately upon one of six register-wheels $a$, distinguished in series from right to left as we front the machine by the consecutive digital numbers 1 to 6, and arranged to run loosely side by side upon a common shaft $a^7$, and interconnected, as hereinafter explained, to transmit motion from one to another at proper intervals. The register-wheels are appropriated as follows: $a'$ to the five-cent key $k'$, $a^2$ to the group of ten-cent keys $k^3$ to $k^{11}$, $a^3$ to the group of dollar keys $k^{13}$ to $k^{21}$, $a^4$ jointly to the ten and twenty dollar keys $k^{22}$ $k^{23}$, ($a^5$ having no manipulating-keys,) and $a^6$ to the credit-key $k^{12}$. The change-key $k^2$ is not connected with the registering mechanism, but only to a "tablet-indicator," and all the other keys are likewise connected with and elevate their appropriate tablets when they are themselves elevated at the rear by being depressed at the forward end, each tablet so raised remaining elevated until released and allowed to fall by the succeeding operation of another key.

The arrangement and grouping of the cent and dollar keys and the general functions of registering and indicating are common in machines of this class; but the credit-key has functions useful and, so far as I am aware, new, as is also the operative mechanism for all the keys, which I will proceed to describe.

The register-wheels $a'$ $a^2$ $a^3$ are provided with spur gear-teeth and are driven by corresponding spur-gears $c'$ $c^2$ $c^3$, centered upon shafts $c$ $d$, arranged in the same axial line beneath and parallel with the shaft $a^7$. The relative position and mounting of these gears will be understood from the rear elevation, Fig. 2. As there shown, gear $c'$ is mounted upon the shaft $d'$, extending to the left and driven from an actuating-connection with the five-cent key $k'$. Gear $c^3$ is mounted upon the shaft $c$, extending to the right to an actuating-connection with the group of dollar-keys $k^{13}$ to $k^{21}$, while the central gear $c^2$ is centered loosely on the shaft $c$ and is actuated by the group of ten-cent keys $k^3$ to $k^{11}$. The register-wheel $a^4$ is operated by a spur-gear $e^4$ upon a second counter-shaft $e'$, arranged in rear of and a little above the shaft $c$, extending to the right to an actuating-connection with the ten and twenty dollar keys $k^{22}$ $k^{23}$ in common, the interconnecting mechanism of the register-wheels being arranged to transmit the motion at proper intervals to the register-wheel $a^5$.

The above-described construction will be more fully hereinafter set forth and described with reference to Figs. 5 to 12 of the drawings.

The register-wheel $a^6$ receives its motion with approximate directness from the credit-key $k^{12}$ by a ratchet-pawl.

The fundamental construction and operative principle of the connecting mechanism between the keys and registering-wheels are as follows: Each key is provided with a vertical duplex standard elevated by the oscillation of the key-levers. Each standard consists of a lower or main portion $f$, which may be pivotally connected with its key at the rear of the latter and rests upon it, and upon being elevated is guided vertically in cross-bars B C, rigidly secured to the supporting-frame A of the machine. The auxiliary portion or tablet-stem $f'$ telescopes vertically into the standard proper $f$, preferably into an open longitudinal slot at the side or rear of the same, and is guided by its telescopic fit therein and by the guide cross-bar D, secured across the top of the frame A, the stem having a bottom rest at the terminus of its telescopic slot in the standard $f$.

It will be convenient, first, to explain the action of the duplex standard in relation to the registering-wheels, which involves the lower portion $f$ only, and, second, those of the two main groups of keys, to wit: the ten-cent keys $k^3$ to $k^{11}$ and the dollar-keys $k^{13}$ to $k^{21}$. Beginning with the group of ten-cent keys $k^3$ to $k^{11}$, each standard $f$ is provided with a bracket $g$, projecting forward, with a flat upper face, these horizontal faces being gaged at consecutively increased heights in series in due proportion, to engage a cross-bar $h$, which extends across the entire series of nine standards and connects opposite equal end cranks $h'$ of a rock-shaft $h^2$, arranged in an axial plane of and to the rear of and below the counter-shaft $c$. A detail of its register-operating mechanism will be found in Figs. 7 and 8, and is as follows: At about a central position the rock-shaft carries a crank $h^3$, operating a ratchet pawl or arm $h^4$, engaging a ratchet-wheel $c^4$, formed as part of the driving gear-wheel $c^2$, which, as explained, operates the registering-wheel $a^2$. A retractile spring $s'$ is introduced, connecting the dog $h^4$ with the crank $h^3$ across the pivotal angle to hold the ratchet-teeth of the dog to those of the ratchet-wheel $c^4$, and to return the cross-bar $h$ to its original position and retract the dog $h^4$ a return-spring $s^2$ is coiled upon the shaft $h^2$, with one terminal upon the cross-bar $h$ and the other carried back to bear against a fixed portion of the frame A. As all the keys oscillate through the same arc, the degree of rotation thus given to the registering-wheel $a^2$ will depend upon the relative time of engaging contact of the brackets $g$ with the cross-bar $h$, depending, as already intimated, upon the relative face heights of the brackets $g$ of the standards $f$. For the group of dollar-keys a similar rock-shaft $h^{20}$ is provided in the same relative position to the right, as seen in rear view, with its cross-bar $h^0$, all the parts being duplicates of those described, except as hereinafter specified, and distinguished by the same letters, but with the "0" added to the designating-numerals. Instead, however, of the crank and dog for operating the registering-wheel, I here employ the following mechanism, exhibited in Figs. 9 and 10: I attach to the cross-bar $h^0$ a chain $x$, passing upward over an idler $x'$, thence downward in a loop around a chain-wheel $i'$, centered loosely upon the shaft $c$, adjacent to a ratchet-wheel $i^2$, affixed to the shaft $c$. The chain-wheel $i'$ carries a pivoted pawl $p'$, playing over the peripheral ratchet-teeth of the ratchet-wheel $i^2$, and held by a spring in the usual manner. The chain $x$ thence passes over a second idler $x^2$, (forming the loop,) thence around third and fourth idlers $x^3$ $x^4$ (at the base of the machine) and back to the cross-bar $h^0$ at the starting-point. The cross-bar $h^0$ being directly actuated in the same manner as the cross-bar $h$ by the brackets $g$ upon the standards $f$ and returned to its normal position by the force of its spring $s^{20}$, each key of the group gives it relative rotation to the register-wheel $a^3$ through the driving-wheel $c^3$; but the pawl $p'$ being set in reverse the movement of the register-wheel takes place during the return of the rock-shaft to its original position by force of the spring.

It will be seen that while the general principle of movement of the dollar group and of the ten-cent group of keys is the same in respect to the movement of the cross-bars by the standards the action of the two upon the registering-wheels differs both in the construction of connecting mechanism employed and its action. The dog $h^4$ in the first case is arranged to act directly upon the registering-wheel and give a direct movement by the pressure of the keys, while in the second case the pawl $p'$ is arranged to act in reverse, so that the actual movement of the registering-wheel $a^3$ is effected by the spring $s^{20}$ in restoring the parts to their original position after the manipulation of the key, the function of the key in this second case being to set the parts for action merely. The reasons for thus varying the mechanism and its function I will explain later.

The connecting mechanism between the five-cent key $k'$ and its registering-wheel (illustrated in Figs. 5 and 6) is made through the left-hand extension of the shaft $d'$, having thereon ratchet-wheel $i^{20}$, operated, however, by a crank-arm $j$, loosely centered on the shaft $d'$, adjacent to the ratchet-wheel $i^{20}$, and carrying a pawl $p^{10}$ in reverse, these parts corresponding with those of the dollar group, the crank-arm being substituted for the chain-wheel $i'$. The opposite end of the shaft $d'$ carries the driving-gear $c'$, meshing with register-wheel $a'$. Motion is given by a chain $x^0$, (attached to the standard $f$ of key $k'$,) passing downward around an idler $x^{10}$ at the base of the frame, and thence upward to the crank-pin $j'$ of the crank-arm $j$. The depression of the key thus draws down the arm $j$ in opposition to the tension of a spiral spring $s^3$, secured to the frame, and which upon release of the key $k'$ rotates the parts to their normal position and rotates the ratchet $i^{20}$ and the registering-wheel $a'$. The central or credit key $k^{12}$ operates its registering-wheel $a^6$ directly through the medium of a dog $l$, engaged by a sliding stud $l'$ in a vertical slot of the standard $f$, as illustrated in Fig. 14. A small spring $s^4$ holds the dog $l$ in contact with the teeth of the registering-wheel $a^6$, and also serves as a pin-stop against the supporting cross-bar E of the frame through which the dog projects.

The ten and twenty dollar keys $k^{22}$ $k^{23}$ operate, as illustrated in Figs. 11, 12, and 13, upon the registering-wheel $a^4$ by means of a spur-pinion $e^4$, mounted upon a counter-shaft $e'$, carrying at its remote end a ratchet-wheel $m^3$ of sufficient width to allow the action of two dogs $m^4$ $m^5$, pivoted to and actuated by the standards $f$ of the keys $k^{22}$ $k^{23}$. One of the dogs having one notch and the other two, a single movement of the key produces its appropriate registering, while the interconnection of the registering-wheels $a^4$ $a^5$ carries the multiples of one hundred dollars to registering-wheel $a^5$.

Having now described the operating-connections between the keys and the registering-wheels, I may explain more at length their combined general functions.

The registering-wheels are provided, independently of the described mechanism, with interconnecting pawl mechanism, whereby the movement of one is transmitted to the next for the ordinary purposes of carrying the totals of a lower to a higher wheel in series. This mechanism I construct, as illustrated in Fig. 15, in a novel manner, as follows: Above the register-wheel shaft I place a corresponding counter-shaft or pivot $n$, on which I arrange small bell-crank pawl-carrier $n'$, the long arm of each being bent downward to lie in the path of a lateral tooth $n^3$ upon one register-wheel, while its short arm carries a pivoted pawl $n^2$, engaging the peripheral teeth of the adjacent register-wheel. A curved spring $n^5$, secured to the frame-work of the machine, bears downwardly upon the long arm $n'$, restoring the bell-crank to its normal position after the action, and a similar spring $n^{10}$ bears from the short arm of the bell-crank upon the pawl $n^2$, performing a similar office in relation thereto. The proportions and transmitting relations are of course the same as in all adding devices of this character; but this construction possesses the especial advantage of being most efficient, besides being accessible for inspection and repair without removing the register-wheels. I also attach a series of spring back-stops $o$ to the register-wheels to prevent accidental displacement by jarring. The arrangement is one that enables each registering-wheel to be independently acted upon by its key-connections, yet always preserves the proper total addition in the ultimately registered number.

It may now be explained that the object of causing the ten-cent group of keys to register by their direct action and the five-cent key and the dollar group to register subsequently by the return action is to enable the operator to register a given sum of dollars and cents at one manual operation of the keys by pressing down the appropriate keys at the same time. As the tens register first, they carry their proper multiplication to the dollar-wheel before the latter is acted upon by its keys, so that the ultimate registering is always correct, no matter what may be the specific relation of those registering-wheels in respect to their own interconnection at the time of the registry.

In order to restore the registering-wheels back to a common position—that is, to show zero (0) at the indicating-apertures—the registering-wheels, which, as explained, run loosely upon a common shaft, are each provided with a pivoted pawl $p^{20}$ at the side, engaging in a longitudinally-extended ratchet slot or groove $p^{21}$ in the shaft, so that upon turning the shaft in the normal direction of travel of the wheels the latter are "picked up" one after another by their respective pawls, according to their relative radial positions at the time, until all engage the shaft in similar relations. A single revolution of the shaft therefore necessarily engages all the registering-wheels and carries them forward to the next zero position, this being effected by applying a key-lever to the squared end of the shaft $a$. As a limit to this movement, a spring catch or detent $o'$ is provided, operated by a cam-finger $o^2$ by a short pivot-handle $o^3$, and engaging in a corresponding groove in the shaft or in a disk $o^4$, attached thereto. The detent, being temporarily released until the shaft is started in rotation, reseats itself and stops the rotation when the proper point is reached.

To prevent injurious jarring to the machine, caused by the impact of the keys under heavy blows, I attach to some moving part of the operating-connection for each key a regulating device by which a too sudden and injurious impact is prevented. I prefer to use for this purpose a small air compression or expansion cylinder $q$, fitted with a piston reciprocated by the movement of the part. The piston is single-acting, and one or both ends of the cylinder are entirely closed, excepting a small air-hole regulated by a screw-plug, through which the air is drawn inward at one movement and forced outward at the other movement of the piston, thus acting somewhat in the manner of a "dash-pot" in hydraulic construction to regulate the movement. The exact position of these regulating devices is determined by convenience. Thus in the present case the attachment of the piston is made to the rock-shafts $h^2$ $h^{20}$ by a rear extending arm $h^{38}$ $h^{40}$, the attachment of the cylinder $q$ being made pivotally to contiguous parts of the frame. For the five-cent key the attachment is made to the wrist-pin $j'$, and I have not deemed it necessary in the present case to attach regulators to the remaining key-movements.

Having thus described the key-movements illustrated in the present embodiment of my invention, it may facilitate the further explanation to refer at this point to the modifications of certain parts exhibited. Thus in Fig. 16 is shown a substitute for the crank-lever and pawl interconnection between the register-wheels, which consists of duplicate spur-pinions moving loosely in pairs, having engaging ratchet-faces in contact, and held in such engagement by lateral springs. One pinion of such pair is constantly in mesh with the toothed periphery of a register-wheel, while its mate is in the engaging path of the lateral tooth $r^3$ of the adjacent register-wheel.

The engaging ratchet-faces of the transmitting pair of pinions are placed so as to permit the higher wheel to rotate independently by the yielding disengagement of the pinion-faces; but upon the engagement of one of the pinions by the lateral tooth of the lower register-wheel the higher register-wheel will be moved forward one space.

The modification shown in Fig. 20 relates to a slight mechanical change whereby I may drive the register-wheels directly without the intervention of the driving-gears $c'$ $c^2$ $c^3$. Thus in the five-cent registering mechanism, Fig. 5, I place the chain-drum directly on an extension of the shaft $a$ and attach to the drum a radial arm or crank $b$, extending forward and joined by an outer cross-bar $b^2$ with a similar crank-arm $b^3$, also centered loosely on the shaft, but adjacent to the five-cent register-wheel. The other actuating parts and connections with the key-lever being as hereinbefore described, a pivoted spring-pawl $b^4$ on the arm $b^3$ engages directly with the peripheral teeth of the register-wheel $a'$ and gives it proper motion.

In connecting register-wheel $a^2$ all parts remain the same, excepting that the ratchet-wheel is placed on the shaft attached to the register-wheel, and the ratchet-arm, by suitable alterations in the proportion of parts merely, drives the ratchet in its new position. Register-wheel $a^3$ is driven by a precisely-similar modification as described for the five-cent key and shown at $b^0$ $b^{10}$ $b^{20}$ $b^{30}$.

Having thus described the key-movements in their relation to the registering devices, it is necessary to describe the tablet or indicating devices.

As previously explained, the tablets containing the individual key values plainly marked thereon are attached to the stems $f'$, telescoped in the standard $f$, and are brought into view by being separately elevated by the key action, and so remain after the standard $f$ drops to its original position. To accomplish this end, I pass the stems $f'$ upward through appropriate slots of a catch-plate $r$, pivotally and eccentrically suspended with a downward and forward inclination between the sides of the frame A, just beneath the upper guide D. The plate $r$ may rest against the front sides of the stems $f'$, or upon two intermediate lever-dogs $t$, attached to the sides of the frame A, as hereinafter explained. The stem $f'$ has upon it at the proper point a projection $f^2$, which upon the elevation of the stem raises the catch-plate in its pivotal upward and forward arc of movement until the stem projection $f^2$ passes through, when the plate drops by gravity back to its original position and below the projection $f^2$ and holds the stem elevated by the resting engagement of the stem projection upon the front edge of the slot through which it has passed. This action of the plate $r$ also causes the tablet last raised to drop back to its original position. I also employ a second slotted plate $r'$, pivotally suspended below and approximately parallel with the first, but with slots of sufficient size to entirely clear the stem projections $f^2$. This plate is actuated by a projection $f^3$ upon the standard $f$, and has assigned to it the functions, first, of operating the bell-signal; second, insuring the dropping of the last tablet previously elevated; third, the operation of the stem-locking devices, hereinafter described; fourth, unlocking the cash-drawer. I will explain these connections and functions separately.

First. The bell is secured to the inside of the front of the frame, with its clapper-arm projecting into the path of a tripping-dog $u$, secured about midway to the front of the plate $r'$. Each movement upward of the plate $r'$ causes a ring of the bell, and at each downward movement the tripping-dog yields and passes below the arm, ready to engage in a new upward movement. The action of the parts will be readily understood from Fig. 17.

Second. To insure the dropping of the last-raised tablet-stem upon the elevation of a new one, I employ two dogs $t$, pivoted one at each inner side of the main frame and extending backward between the plates $r$ $r'$ and resting at the outside upon the pivotal end of the lower plate $r'$, as shown in Figs. 5, 7, 9, 11, and 14, which show these parts in various positions during the movement. Upon elevating the lower plate $r'$ by contact of the projection $f^3$, (which occurs after the plate $r$ has been raised by the projection $f^2$,) as indicated in Fig. 11, the outer ends of the dogs $t$ engage the upper plate $r$ and raise it far enough, as indicated in Fig. 9, to insure the dropping of the stem previously held. A set-screw $t'$, passed through the dog $t$, forms at its under side an adjustable abutment for the contact of the plate $r'$, by which the exactness of the movement may be regulated for each key.

Third. The stem-locking devices have two functions to compel the completion of the registering movement of each key when once begun and to prevent a second registering movement after it has started on its descent until it has reached its starting-point, the general object being to prevent any accidentally wrong or intentionally false registration. To this end I provide each standard $f$ with a series of ratchet-teeth at the back in two sets, the lower set $w'$, below the lower guide-bar B, facing downward, and the upper set $w^2$, above the guide-bar B and below the guide-bar C, facing upward. The number of these teeth in each case corresponds substantially with the number of cog-teeth of the register-wheels acted upon by the key-connecting mechanism. The action of the locking-plates will be best understood in connection with Figs. 18 and 19. The locking-teeth $w'$ are engaged upon the upward movement of the standards $f$ by a sliding plate $v'$ upon the upper side of the lower guide-bar B and upon the lower movement by a similar sliding plate $v^2$ upon the upper side of the next upper guide-bar C. A set of two such catch-plates is arranged for each group of keys belonging to a series, and each plate is provided with a serrated edge facing the standards $f$, with the recesses in line with the set of ratchet-teeth upon the standard. The upper and lower catch-plates of a set are "offset" in relation to each other in respect to the positions of their recesses relative to the lines of ratchet-teeth upon the standards, and are interconnected by a vertical lever $v^3$, centrally pivoted to the back of the frame and engaged with the plates at each end in such manner that when a longitudinal sliding movement is given to one plate the other is compelled by the lever to move in the opposite direction. This movement is given to the lower plate by a link $v^4$, connecting it at the lower side of the guide-bar B with a horizontal bell-crank $v^5$, engaging with a vertical bell-crank $v^6$, having its bearing upon a downward projection of the guide-bar B and engaged in turn by a link $v^7$, extending thence upward with a projection $v^8$, lying over the plate $r'$, from which it receives its upward motion. The plates $v'$ $v^2$ have, in addition to the positive longitudinal movement referred to, a lateral movement against the resiliency of springs $s^5$, placed behind them and acting against a suitable abutment to hold them normally against the standards $f$. The plates normally stand in such relative positions as to present the recesses of one plate and the flush edge of the other in line with the teeth on the standards. As a standard rises, for example, the upwardly-projecting teeth pass the upper plate through the recesses without hinderance, while the lower teeth present their inclined sides to the flush edge of the lower plate and successively shove it aside by contact of their inclined faces, while the resiliency of the spring returns it beneath each tooth, thus preventing it from dropping back during the movement. When the pivotal plate $r'$ is elevated, (which occurs toward the close of the key movement,) it engages and carries upward the link $v^7$ by means of the projection $v^8$ and shifts the spring-plates $v'\,v^2$ into relatively opposite positions from those just described, so that when the standard $f$ descends its lower teeth have free passage through the recesses of the lower catch-plate, and the upper teeth present their inclined surfaces to the flush edge of the upper plate and successively thrust it aside against the resiliency of its spring, the plate returning behind each tooth in turn, and, as the key is pivotally linked to the standard, preventing any reverse movement of the key until it has reached its normal position. After the teeth have passed the plates the closing downward movement of the cross-bar $h$ engages the horizontal arm of the bell-crank $v^6$ and restores both catch-plates to their first and normal position.

The catch devices thus described apply collectively to a group of keys of a given series—as, for example, the group $k^3\,k^{11}$ indicating dimes—and a duplicate of the mechanism described is applied to the dollar group $k^{13}$ to $k^{21}$. I do not apply the catch devices to the ten and twenty dollar keys, the credit-key, or the change-key; but as the five-cent key acts each time upon five notches of its registering-wheel I apply similar catch-plates $v^{10}\,v^{20}$ to its action. They are operated, however, entirely by the key-lever $k'$, whose rear end when nearing its upper limit strikes the horizontal arm of a bell-crank $z'$, having its bearings at the under side of the guide-bar B and engaging the plate $v^{20}$ with its vertical arm. A link $z^2$, connected to the arm of the bell-crank $z'$ and having a projection $z^3$ in the path of and beneath the key-lever $k'$, returns the parts to their normal position by the return of the key $k'$ to its normal position. The plate $r'$ is also used to trip the till or drawer-lock 20 just as the alarm is sounded. For this purpose the bolt is carried by a vertical rod 21, having an arm 23 near its upper end, which in turn carries a set-screw 22, that is operated on by the plate $r'$.

To recapitulate the general action and further explain the objects, each key registers the appropriate amount on the registering-wheels, the total being carried forward by the interaction of the wheels. At each action of a key its appropriate tablet is elevated into view, dropping the last one raised.

The registering action is effected solely through the lower sections $f$ of the duplex standards, which, in addition, carry up the tablet-stems to their engagement with the retaining-plate and return to their normal position, leaving the tablet-stems elevated. In case of a second action of a given key the tablet already elevated will remain so. The series—first, five-cent, (single key;) second, ten cents, (nine keys;) third, dollars, (nine keys,) and fourth, ten dollars, (single key)—are arranged to act at opposite movements of the key-lever—i. e., the five-cent key at the return movement of its lever, the ten-cent keys at the direct movement, the dollar-keys at the return movement, and the ten and twenty dollar keys at the direct movement—whereby a given sum of dollars and cents—for example, nineteen dollars and fifty-five cents—can be registered at one manual operation by striking four keys at once—viz., the ten-dollar key, nine-dollar key, fifty-cent key, and five-cent key.

A movement of the key once begun and carried far enough to begin its registering action is locked at each successive stage against return, and can only be released by continuing and completing its operation. Likewise, having begun its return movement, it is locked at each successive stage until it has completely returned to its normal position, whereby any double or partial registering, either through accident or mistake, is prevented.

I have shown in the drawings a key-locking device 24, consisting, essentially, of a series of circular disks or balls held in a guideway arranged across the path of the keys and cut across laterally by keyways, the balls or disks being laterally displaced in their guideway by any one key, thereby locking the remaining keyways and preventing the use of more than one key at a time. This device being fully described in another pending application of J. F. Trader, Serial No. 312,093, filed May 25, 1889, as to which I am part owner, I have not thought it necessary to specifically describe the same, as I make no claim to the same further than to the combination generally of a key-locking device of this nature with my own mechanism for compelling the completion of each key movement once begun. In Fig. 3 is also shown a locking-plate 25, pivoted in the lower front portion of the frame A and adapted when thrown up, as indicated in dotted lines, to engage and lock the key-levers against operation.

The pivotal plate or "wing," it will be observed, is actuated directly and positively upward by the impact of any one of the standards $f$, which rest directly upon and are pivoted to the keys, the return of the plate to its normal position being effected by its own gravity upon being released. The plate thus actuated I employ as a prime mover for actuating the bell-signal for actuating the locking-plates of the key-standards. The bell-connections are substantially the same and are operated in the same manner as I have shown in another application pending herewith, Serial No. 314,104, filed June 13, 1889, and although I have fully illustrated the mechanism in the drawings I have not deemed it necessary to specifically describe the same herein. In such other application, however, this function was assigned to a pivotal plate corresponding with the plate $r'$ of the present illustration; but in respect to the bell-signal the action of the parts is the same. The same remarks apply to the drawer-locking devices, which are also illustrated herein, but not specifically described. My purpose in thus illustrating these adjuncts is to direct attention to their new connection with a prime mover—to wit, the lower plate $r'$, which is a positively-moved element not connected with the registering mechanism nor with the tablet-stems. Thus the main functions of the machine—to wit, the registering, the tablet-raising, and the signal-operating and drawer-locking—although deriving their initial motive power from the same source, (the keys,) are separate and independently performed, whereby I am enabled both to extend the range of useful functions in this class of machines, simplify the means employed, and attain greater certainty of action.

I claim as my invention and desire to secure by Letters Patent of the United States—

1. The combination, in a cash-register, of a series of keys in consecutive groups representing successive unit values, the independent keys of each group representing multiples of such units, a series of independent register-wheels loose upon a common axis and representing in a single consecutive series all the unit values of the machine and appropriated one to each group of keys, a peripheral line of ratchet-teeth and a peripheral line of lateral projections upon each register-wheel at opposite sides, a fixed counter-shaft parallel to the axis of the register-wheels, and a series of independent bell-cranks loosely pivoted upon the counter-shaft, each having one arm projecting into the path of the lateral projections of one register-wheel and the other arm into the plane of the ratchet-teeth of the next adjacent register-wheel and carrying a pivoted pawl engaging said ratchet-teeth, substantially as set forth.

2. In a cash-registering apparatus, the combination of a series of keys having successive multiple values singly or in groups, a corresponding series of registering-wheels having independent transmitting or carrying connections each with the next higher, and independent connecting mechanism between each key or group of keys and its or their appropriate register-wheel arranged to operate alternately (as between the successive keys or groups appropriated to the respective register-wheels) upon the register-wheels by direct manipulation of the keys and their automatic return to their normal position, whereby a given sum occupying two or more numeral places may be registered at one and the same manual operation, while preserving the correct grand total of registers in successive operations of the machine, substantially as set forth.

3. In a cash-register, the combination of a register-wheel, a group of pivoted key-levers appropriated thereto, a series of standards elevated by said key-levers, brackets projecting from said standards at successive graduated heights, an independent rock-shaft provided with corresponding crank-arms, a cross-bar connecting said crank-arms and arranged above and in the path of said brackets, a rack-bar adapted to be reciprocated by said rock-shaft and engaging the register-wheel, and a spring arranged to hold said rock-shaft in its initial position, whereby the elevation of any standard of the series raises the cross-bar, rotates the rock-shaft, and impels the rack-bar against the force of the spring, and the spring returns the same to normal position upon the lowering of the standards, substantially as set forth.

4. In a cash-register, the combination of a pivoted crank-arm arranged above the key-lever and connected mediately to the register-wheel as a mover, a spring upholding said crank-arm in its elevated position, an actuating key-lever, an idler-sheave below said key, and a belt connecting the key-lever to said crank-arm and passing around said idler-sheave, substantially as set forth.

5. The combination, in a cash-register, of a pivoted actuating-key, a standard elevated thereby, a ratchet-wheel connected mediately to the register-wheel, a concentric arm playing loosely adjacent to said ratchet and carrying a pivoted pawl, a chain belt connected at one end to said standard and at the other end to said crank-arm, and a spring connecting said crank-arm to the fixed frame, acting in a direction opposite to the pull of the chain, substantially as set forth.

6. In a cash-register, the combination of a register-wheel, an actuating-key, a ratchet-wheel connected mediately with said register-wheel, a concentric crank-arm playing loosely adjacent to said ratchet-wheel, a pawl pivoted to said arm and engaging said ratchet-wheel, a spring connecting said arm to a fixed portion of the frame and holding the pawl engaged in the retractile movement of said arm, and a chain connecting said crank-arm mediately with the actuating-key, whereby the movement of the key against the spring trails the pawl in reverse without engagement, and the retraction of the spring moves the arm and ultimately the register-wheel, substantially as set forth.

7. In a cash register and indicator, in combination with a lifting-key, a lifting-rod in two parts—viz., a lower portion or standard resting upon and immediately actuated by said key-lever and an upper portion or tablet-stem moving longitudinally upon or within the standard, but otherwise independent of the same, substantially as set forth.

8. In a cash register and indicator, a two-part extensible lifting-rod, the lower portion or carrying-standard being pivotally attached to the key-lever and carrying one or more bracket projections for actuating the moving parts of the register mechanism and the upper part carried within or upon the standard as a tablet-supporting stem, substantially as set forth.

9. In a cash register and indicator, in combination with a series of key-levers, lifting-standards actuated by said key-levers, brackets projecting from said standards at a uniform height, and an independent plate pivotally suspended horizontally across and at a downward inclination in the path of said brackets, and actuated thereby, selectively and uniformly, by any one of said keys, and utilized as mover to operate the signal or perform other incidental functions independently of the actuation of the register-wheels, substantially as set forth.

10. In a cash register and indicator, in combination with a series of keys and duplex lifting-rods, as described, two oscillating plates suspended in and inclined to the paths of said lifting-rods and actuated thereby, the lower of said plates being operated by the lower sections of said lifting-rods as a prime mover for operating the bell and for other purposes, and the upper plate being actuated by the upper sections of tablet-stems of said lifting-rods to retain the same in elevated position, substantially as set forth.

11. In a registering and indicating apparatus, the combination of a series of keys in groups arranged for operation by manual depression, register-wheels and other indicating mechanism appropriated in common to the individual keys of a group and actuated selectively thereby through the medium of a prime mover actuated by any one of said keys, and an air piston and cylinder connected with said prime mover and a fixed portion of the frame, respectively, for controlling the initial impact of said keys and regulating the actuating movement to prevent injury or overregistering, substantially as set forth.

12. In a cash-register, the combination of a series of actuating-keys, a series of standards connected with and actuated thereby, two series of ratchet projections upon each standard, each series facing in a direction opposite to the other, and a pair of movable locking-plates extending across said standards in the path of the ratchet projections, having recesses corresponding with the positions of the standards and adjustable alternately into engaging relations therewith, substantially as and for the purpose specified.

13. In a cash-register, the combination of a series of actuating-keys, a series of standards connected therewith, respectively, and provided with two series of ratchet-teeth facing in opposite directions, a pair of yielding recessed locking-plates carried in sliding bearings across said series of keys, respectively, and a shifting-lever pivoted between said plates, and connections between said lever and the moving parts of the machine, whereby the plates are shifted by the action of any key of the series to appropriate positions to lock the key against return both in an initial and the reverse movement once begun and compel the completion of the same, substantially as and for the purpose specified.

14. In a cash-register of the character indicated, in combination with a series of registering key-levers and a series of standards carried thereby, each standard having upon its outer face two series of oppositely-faced ratchet-teeth corresponding with the number of teeth of the register-wheel actuated by said key and standard, two yielding catch-plates shiftable laterally and alternately into engaging relations with their appropriate series of ratchet-teeth and actuated, selectively, by any key of the series to engage it against return until the movement begun in either direction is completed, substantially as set forth.

15. In a cash-register of the character indicated, in combination with the keys and registering connections, a system of laterally-displaceable key-stops applied to each series or group of keys to prevent the use of more than one key at a time of said group, and sliding locking-plates, as described, to compel the completion of a key movement once begun, whereby false registration through tampering with the keys is prevented, substantially as set forth.

In testimony whereof I affix my signature in presence of two witnesses.

JOHN F. PFEFFER.

Witnesses:
  EWELL A. DICK,
  L. M. HOSEA.